United States Patent Office 3,073,870
Patented Jan. 15, 1963

3,073,870
PROCESS FOR THE PYROLYSIS OF CHClF$_2$ AND CH$_3$Cl TO PREPARE CH$_2$=CF$_2$
David M. Marquis, Brandywine Hundred, Del., assignor to E. I. du Pont de Nemours and Company, Wilmington, Del., a corporation of Delaware
No Drawing. Filed Nov. 25, 1958, Ser. No. 776,183
1 Claim. (Cl. 260—653.3)

This invention relates to a process for the preparation of fluorine-containing compounds and more particularly to a pyrolytic process for preparing fluoroolefins.

Heretofore fluorine-containing olefins have been prepared by several general procedures. One of these methods involves the dehydrohalogenation of certain hydrohaloethanes. For example, vinylidene fluoride can be prepared from difluoromonobromoethane. Another method involves the dehalogenation of certain haloethanes in the presence of metals such as zinc. These methods have not been entirely satisfactory either because of low yields or the problems involved in preparing the particular ethane starting materials. Thus, in the preparation of vinylidene fluoride by the dehydrohalogenation of a hydrohaloethane, it is necessary to employ several steps in order to prepare the proper hydrohaloethane.

It is an object of this invention to provide a process for the preparation of fluoroolefins. A further object is to provide a novel pyrolytic process for the preparation of fluoroolefins of the general formula CF$_2$=CXY, wherein X is hydrogen, chlorine or fluorine and Y is hydrogen or chlorine. A still further object is to provide a one-step pyrolytic process for the preparation of these fluoroolefins from a mixture of two different hydrohalomethanes.

These and other objects of this invention are accomplished by the process of preparing fluoroolefins of the structure CF$_2$=CXY wherein X is hydrogen, chlorine or fluorine and Y is hydrogen or chlorine, which comprises pyrolyzing a mixture of (1) a compound of the structure CHF$_2$Q wherein Q is bromine or chlorine and (2) a compound of the structure CH$_m$Z$_n$Cl$_p$ wherein Z is bromine or fluorine, $m$ is 1, 2 or 3, $n$ is 0 or 1 and $p$ is selected so that the sum of $m$, $n$ and $p$ equals 4, at a temperature of from about 700° C. to 950° C. with the molar ratio of CHF$_2$Q to CH$_m$Z$_n$Cl$_p$ being from about 0.5:1 to 1.5:1.

The process of the present invention is relatively simple to carry out. The two different hydrohalomethanes which make up the mixture are continuously introduced in the vapor phase into a reactor which is inert to this mixture. Suitable inert materials include carbon and the noble metals, particularly platinum and silver. A convenient form of reactor is a platinum-lined metal tube. The reaction temperature should be maintained at about 700° C. to about 950° C. When a reactor tube is used this tube may be heated by conventional means such as by placing the tube in an electric furnace which supplies the heat necessary to maintain the reaction temperature. It has been found that at temperatures below about 700° C. the conversion of the mixture to the desired olefin is reduced to a point where the process becomes impracticable. On the other hand, at temperatures greater than about 950° C. there is a tendency to form less desirable products.

The mixture of hydrohalomethanes should remain in the effectively heated zone of the reactor, i.e., the zone maintained at a temperature of from about 700° C. to about 950° C. for a period of from about 0.5 to 3.0 seconds. This is referred to hereinafter as the contact time. It has been determined that with shorter contact times low yields of the desired fluoroolefins are obtained whereas longer contact times produce less desirable products such as substituted propanes and butanes and also tend to carbonize the reactants. In determining contact times one must consider the volume of the effectively heated zone of the reactor, the volume occupied by the reactants at the time they are introduced into the reactor and the rate of feeding the reactants into the reactor. The volume of the effectively heated zone is determined by multiplying the effectively heated length times the cross-sectional area and the volumes occupied by the reactants are calculated at 25° C. and 760 mm. (Hg) absolute pressure. The contact time will be controlled by the feed rate. After the reaction takes place, the product gases are collected from the outlet of the reactor tube, cooled, scrubbed with water to remove acidic gases and then dried. The resultant product may then be separated by distillation.

The mixture of starting materials which is used in the process of the pressent invention may be characterized as being a mixture of hydrohalomethanes. The first member of this mixture may be defined as being a compound of the structure CHF$_2$Q wherein Q is as defined above. Specific examples of this component are chlorodifluoromethane and bromodifluoromethane. The other member of the mixture is a compound of the structure CH$_m$Z$_n$Cl$_p$ wherein Z, $m$, $n$ and $p$ are as defined above. Representative examples of this compound are methyl chloride, chloroform, dichlorofluoromethane, chlorofluoromethane, methylene chloride, methyl bromide and bromochloromethane. The preferred mixture consists of chlorodifluoromethane and methyl chloride which produces vinylidene fluoride. The components of this mixture should be present in a molar ratio of CHF$_2$Q to CH$_m$Z$_n$Cl$_p$ of about 0.5:1 to 1.5:1.

The fluoroolefins which are obtained by the process of the present invention have the structure CF$_2$=CXY wherein X and Y are as defined above. Representative olefins include vinylidene fluoride, 2-chloro-1,1-difluoroethylene, 1,1-dichloro-2,2-difluoroethylene, trifluoroethylene and chlorotrifluoroethylene.

The process of the present invention is particularly useful for the preparation of vinylidene fluoride in good yields and represents an advance over prior art procedures in that a wide variety of fluoroolefins can be prepared. These olefins are particularly useful in that they may be polymerized or copolymerized, by known procedures, to form valuable polymeric products.

The following examples will better illustrate the nature of the present invention; however, the invention is not intended to be limited to these examples. Parts are by weight unless otherwise indicated.

In all the following examples the reactor used is a platinum-lined metal tube, 6 millimeters inside diameter and 24 inches in length, heated in an 8-inch electric furnace over an effective reaction length of 5 inches. Analysis of the products is made by mass spectrometry.

*Example 1.—Preparation of Vinylidene Fluoride*

Over a period of 60 minutes a mixture of 31.8 parts of CHClF$_2$ and 18.5 parts of CH$_3$Cl is passed through the reactor which is maintained at 900° C. The contact time is 0.72 second. The acid produced is scrubbed out with water. The gaseous products are dried by passage through a tower of CaSO$_4$ and then condensed in a glass trap cooled in liquid nitrogen. Titration of the scrubber solution shows that 26.3 parts of HCl is produced. Approximately 0.5 part of carbon and 19.5 parts of volatile products is obtained, the composition of which is comprised of 60.7 mol percent of CH$_2$=CF$_2$ and 1.3 mol percent of CF$_2$=CHCl.

*Example 2.—Preparation of 1,1-Dichloro-2,2-Difluoroethylene*

Using the reactor of Example 1, over a period of 4 hours, a mixture of 114 parts of $CHClF_2$ and 150 parts of $CHCl_3$ is passed through the reactor which is held at 700° C. The contact time is 0.82 second. The acid formed is removed by scrubbing with water. Seventy grams of liquid of boiling point above room temperature condenses in the scrubber. The remainder of the dried product is volatile and contains 40.9 mol percent of $CF_2=CCl_2$.

*Example 3.—Preparation of Chlorotrifluoroethylene*

Using the reactor of Example 1 at 800° C., a mixture of 31.7 parts of $CHClF_2$ and 37.8 parts of $CHCl_2F$ is passed through the reactor in 90 minutes. The contact time is 1.08 seconds. After removing the acid formed with water, the dried product stream contains 18.7 mol percent of $CF_2=CFCl$.

*Example 4.—Preparation of Trifluoroethylene*

Following the procedure of Example 3 a mixture of 21.2 parts of $CHClF_2$ and 15.1 parts of $CH_2ClF$ is passed through the reactor over a period of 60 minutes. The contact time is 1.14 seconds. After removal of acid by washing and drying the gases, a product is obtained which contains 17.9 mol percent of $CF_2=CHF$, 9.3 mol percent of $CF_2=CHCl$ and 9.3 mol percent of $CF_2=CFCl$.

*Example 5.—Preparation of 2 - Chloro - 1,1 - Difluoroethylene*

During a period of 80 minutes a mixture of 28.2 parts of $CHClF_2$ and 32.5 parts of $CH_2Cl_2$ is passed through the reactor of Example 1 held at 700° C. The contact time is 0.05 second. After removal of acid by scrubbing with water, the high boiling products are condensed in an ice-cooled trap. 32 parts of material is condensed and is substantially all $CH_2Cl_2$, B.P. 40° C. The dried volatile product contains 5.7 mol percent of $CF_2=CHCl$.

*Example 6.—Preparation of Vinylidene Fluoride*

A mixture of 14.1 parts of $CHClF_2$ and 16.3 parts of $CH_3Br$ is passed through the reactor of Example 1 at 900° C. over a period of 40 minutes. The contact time is 1.18 seconds. After being scrubbed with water to remove the acid and dried, the product stream obtained contains 45.4 mol percent of $CH_2=CF_2$.

*Example 7.—Preparation of Vinylidene Fluoride*

A mixture of 27.4 parts of $CHBrF_2$ and 26.3 parts of $CH_3Br$ is passed through the reactor of Example 1 at 700° C. during 60 minutes. The contact time is 1.09 seconds. Removal of the by-product acid by water scrubbing, followed by drying, leaves a product which contains 13.7 mol percent of $CH_2=CF_2$.

*Example 8.—Preparation of 2 - Chloro - 1,1 - Difluoroethylene*

A mixture of $CHClF_2$ added at a rate of 6.0 liters/hr. and $CH_2ClBr$ added at a rate of about 18 ml./hr. is passed through the reactor of Example 1 at 750 C. during 30 minutes. Contact time is 1.01 seconds and the molar ratio of $CHClF_2$ to $CH_2ClBr$ is 0.9:1. Removal of the acid by water wash leaves a product containing, after being dried, 4.8 mol percent of $CF_2=CHCl$.

As many widely different embodiments of this invention may be made without departing from the spirit and scope thereof, it is to be understood that this invention is not limited to the specific embodiments thereof except as defined in the appended claim.

What is claimed is:

A process for preparing vinylidene fluoride which comprises pyrolyzing a mixture of chlorodifluoromethane and methyl chloride at a temperature from about 700° C. to about 950° C. at a contact time of from about 0.5 to 3.0 seconds with the molar ratio of chlorodifluoromethane to methyl chloride being from about 0.5:1 to 1.5:1.

References Cited in the file of this patent

UNITED STATES PATENTS

| | | |
|---|---|---|
| 2,551,573 | Downing et al. | May 8, 1951 |
| 2,931,840 | Marquis | Apr. 5, 1960 |

FOREIGN PATENTS

| | | |
|---|---|---|
| 505,153 | Canada | Aug. 17, 1954 |